(12) United States Patent
Fayard et al.

(10) Patent No.: US 6,514,555 B1
(45) Date of Patent: Feb. 4, 2003

(54) ARTICLES OF FROZEN CONFECTIONERY CONTAINING INCLUSIONS, AND MANUFACTURING PROCESS

(75) Inventors: Gilles Fayard, Epalinges (CH); Martine Fiaux, Vevey (CH)

(73) Assignee: Nestec S.A., Vevey (CH)

( * ) Notice: Subject to any disclaimer, the term of this patent is extended or adjusted under 35 U.S.C. 154(b) by 344 days.

(21) Appl. No.: 09/670,270

(22) Filed: Sep. 27, 2000

Related U.S. Application Data

(63) Continuation-in-part of application No. 08/859,658, filed on May 20, 1997, now abandoned.

(30) Foreign Application Priority Data

May 21, 1996 (EP) .............................. 96201350

(51) Int. Cl.⁷ .............................. A23G 9/02; A23G 2/00
(52) U.S. Cl. .................. 426/565; 426/586; 426/588; 426/516; 426/519; 426/524; 62/342; 62/343
(58) Field of Search .................. 426/565, 586, 426/587, 588, 516, 519, 522, 524; 62/342, 343

(56) References Cited

U.S. PATENT DOCUMENTS

| | | | |
|---|---|---|---|
| 2,246,871 A | 6/1941 | Balch | 426/249 |
| 2,284,651 A | 6/1942 | Gundlach et al. | 107/54 |
| 2,289,326 A | 7/1942 | Howser | |
| 2,334,052 A | 11/1943 | Wedin | 426/249 |
| 2,344,901 A | 3/1944 | Routh | 426/249 |
| 2,347,083 A | 4/1944 | Connellee et al. | 107/54 |
| 2,389,084 A | 11/1945 | Routh | 107/1 |
| 2,402,931 A | 6/1946 | Thomas | 62/114 |
| 2,550,656 A | 4/1951 | Knechtges | 99/131 |
| 2,576,842 A | 11/1951 | Lehner | 426/249 |
| 2,646,757 A | 7/1953 | Hackmann | 426/249 |
| 2,651,575 A | 9/1953 | Talburt et al. | 99/136 |
| 2,689,539 A | 9/1954 | Peyton | 126/249 |
| 2,722,177 A | 11/1955 | Rauth | 107/1 |
| 3,014,437 A | 12/1961 | Dutchess | 107/1 |
| 3,671,268 A | 6/1972 | Blake et al. | 99/136 |
| 3,914,440 A | 10/1975 | Witzig | 426/130 |
| 3,971,853 A | 7/1976 | Crowder | 426/249 |
| 3,991,217 A | 11/1976 | Kinney | 426/249 |
| 4,189,502 A | 2/1980 | Rubenstein | 426/249 |
| 4,500,553 A | 2/1985 | Liggett et al. | 426/101 |
| 4,504,511 A | 3/1985 | Binley | 426/565 |
| 4,554,168 A | 11/1985 | Gunnerson | 426/473 |
| 4,758,097 A | 7/1988 | Iles, Sr. | 366/149 |
| 4,873,104 A | 10/1989 | Butcher et al. | 426/249 |
| 4,923,706 A | 5/1990 | Binley et al. | 426/516 |
| 5,017,390 A | 5/1991 | Sawant | 426/100 |
| 5,024,066 A | 6/1991 | Gaavec | 62/306 |
| 5,048,405 A | 9/1991 | Takahashi et al. | 99/470 |

(List continued on next page.)

OTHER PUBLICATIONS

Arbuckle, "Ice Cream," Third Edition, pp. 240, 241, 245–247.

D.P. Donhowe et al.,"Determination of Ice Crystal Size Distributions in Frozen Desserts," *J. Dairy Sci.*, 74: 3334–3344 (1991).

*Primary Examiner*—Nina Bhat
(74) *Attorney, Agent, or Firm*—Winston & Strawn

(57) ABSTRACT

Composite articles of frozen confectionery are manufactured containing inclusions, by forming extrusions of a central filling surrounded by a sleeve of frozen composition by co-extrusion at a temperature for the frozen composition of less than or equal to about −8° C., and the extrusions are then processed into a mass of frozen composition incorporating the inclusions by coiling up the extrusion or folding it on itself. The filling is injected into the heart of the vein of frozen composition leaving the extruder, by a co-extrusion nozzle which may be moving of static.

11 Claims, 2 Drawing Sheets

U.S. PATENT DOCUMENTS

| | | |
|---|---|---|
| 5,084,295 A | 1/1992 | Whelan et al. .............. 426/565 |
| 5,215,777 A | 6/1993 | Asher et al. ................. 426/565 |
| 5,256,438 A | 10/1993 | Lewis et al. ................. 426/615 |
| 5,283,070 A | 2/1994 | Bertrand et al. ............ 426/249 |
| 5,345,781 A | 9/1994 | Fels et al. ..................... 62/343 |
| 5,356,648 A | 10/1994 | Kortschot ................... 426/249 |
| 5,698,251 A | 12/1997 | Dahms et al. ............... 426/249 |
| 5,888,567 A * | 3/1999 | Daouse ........................ 426/249 |
| 5,919,510 A * | 7/1999 | Fayard et al. ................ 426/565 |
| 6,051,267 A * | 4/2000 | Jury et al. ................... 426/516 |
| 6,228,412 B1 * | 5/2001 | Groux et al. ................ 426/516 |

* cited by examiner

ARTICLES OF FROZEN CONFECTIONERY CONTAINING INCLUSIONS, AND MANUFACTURING PROCESS

CROSS REFERENCE TO RELATED APPLICATIONS

This application is a continuation-in-part application of application Ser. No. 08/859,658, filed May 20, 1997 now abandoned.

TECHNICAL FIELD

The present invention relates to composite articles of frozen confectionery comprising distinct inclusions of fillings in the mass of a frozen composition.

BACKGROUND ART

It is known how to incorporate and uniformly distribute pieces, for example pieces of comfits or dried fruits, in a mass of frozen composition, for filling pots or trays in the manufacture of family or bulk portions. The device described in DE-A-3521612, for example, makes it possible to distribute uniformly already formed pieces of a certain size in a vein of ice cream, from a hopper with the aid of a rotating drum with retractable blades pressing against a cylindrical wall, the function of which is to load a constant quantity of pieces into a sector of the drum and to distribute it uniformly in the stream of ice cream.

In U.S. Pat. No. 3,014,437, for example, different masses of plastic products such as ice cream masses with different flavors are co-extruded in the form of extrusions, and they are then twisted by imparting a rotating movement with the aid of a rotating blade in the form of a butterfly. One of the plastic products may be a fondant.

SUMMARY OF THE INVENTION

The object of the present invention is to meter into a frozen composition inclusions which in particular have a different composition, color and flavor from those of the frozen composition and to distribute them in a random manner in the mass, so that there is a distinct, preferably contrasted, separation between the inclusions and the frozen composition and so that the inclusions are not clustered together by gravity, for example at the bottom of a container during filling.

The article according to the invention is characterized in that it comprises a mass of frozen composition and a filling in the form of inclusions which are stabilized and distributed in a random manner in the mass of frozen composition and in that the inclusions are produced by the co-extrusion of a liquid central filling that can be pumped and a frozen composition that can be extruded at a temperature of less than or equal to about −8° C.

According to the invention, a "frozen composition" is understood to be an ice cream, a sorbet or a sherbet, which is aerated or expanded to a variable extent, or a frozen culinary mousse which is aerated to a variable extent.

Within the context of the invention, a filling consists of an aqueous or fatty composition having a dry matter content of preferably about 28 to 80 wt. %, and containing a sugar.

As a sugar, use may be made of granulated sucrose, polysaccharides, more particularly a glucose syrup, burnt sugar, invert sugar, or a maltodextrin, more particularly those having a high dextrose equivalent, for example approximately 100.

The filling may consist of a fruit or vegetable puree, preferably pure, i.e. without any additive. The filling may optionally contain a minimum quantity, much lower than that normally used, of a gelling or thickening agent such as, for example, a gum, a pectin or a gelatin.

The filling may be honey, caramel or fruit puree and may have been prepared from a paste of dried fruit, praline, nougat or nougatine. It may contain flavorings and colorings, for example chocolate, coffee, or fruit flavorings and, optionally, preservatives.

Such fillings may contain small inclusions such as, for example, fragments of chocolate or dried fruit.

The filling may be in the form of a fondant or of a paste with a fatty composition, optionally aerated, for example a fruit or chocolate mousse.

According to the nature of its composition, the filling will result in solid inclusions in the mass of the frozen composition that are hard or liquid to a varying extent and that are viscous to a varying extent. It is important that the filling can be pumped and can be conveyed to the outlet die.

The invention also concerns a process for manufacturing a frozen composition containing inclusions, characterized in that extrusions of a central filling surrounded by a sleeve of frozen composition are formed by co-extrusion at a temperature for the frozen composition of less than or equal to −8° C., and in that the extrusions are processed into a mass of frozen composition incorporating the inclusions distributed in a random manner in the mass of frozen composition.

In the process of the invention, it is important that the frozen composition can be extruded at a very low temperature and dissipates the energy that it has stored up in the form of negative calories on leaving the extrusion die, so that the emerging co-extrusion can be shaped. This can be achieved, for example, by coiling up the extrusion or folding it on itself by means of a moving co-extrusion nozzle, continuously delivering a coiled or folded extrusion at the outlet from the die, which can then be cut into portions, or it can be achieved by filling a container by means of a static co-extrusion nozzle, in a discontinuous manner. Such a container may be a pot, a cornet, a tray for a family or "bulk" portion or an ice lolly mould. In this method of filling a container, the co-extrusion nozzle may be given an up-and-down movement, for example so that it falls to a level close to the bottom of the container and then rises as the extrusion is metered in. During this operation, the container may remain stationary or, as a variant, the nozzle may remain stationary and the container moves during filling. When the nozzle moves, provision is made for it to be connected to the extruder by a flexible connection.

In practice, the extrusion has a certain plasticity over a certain period of time, for example of the order of about 10 seconds. It should be noted that, according to the invention, the Theological properties of the filling do not play a determining part in achieving co-extrusion. Thus it is possible to manufacture a composite extrusion and to shape it, in particular in a container, without taking special precautions as regards the physical properties of the filling, in particular its viscosity and density, relative to those of the frozen composition, since the stability of the inclusions is ensured by the state of the frozen composition surrounding the filling. The process of the invention also permits a large variation in the choice and nature of the fillings.

In principle, any process enabling a frozen composition to be extruded at a very low temperature is applicable. It is preferable to use a single-screw or twin-screw extrusion apparatus, in which cooling and incorporation of air is carried out in a single apparatus.

According to a preferred embodiment of the process, the raw materials making up the composition to be frozen are passed through a device provided with two parallel endless screws, revolving in the same direction.

According to a particular embodiment, a gas, for example air, is injected into the barrel in sufficient quantity to provide an overrun of about 20 to 150% and preferably 80 to 100%.

In order to put the process into practice, a composition is prepared in a conventional manner for ice cream, low-fat ice cream, sorbet or sherbet, based, according to the recipe, on milk, skimmed milk, cream, concentrated milk, milk powder or butter oil to which has been added sucrose, glucose, fruit dextrose, fruit pulp or vegetable pulp and stabilizing hydrocolloids, such as, for example, carrageenates, alginates, carob gum, and emulsifiers, as for example partial glycerides, and flavorings. After mixing the ingredients intimately in the proportions dictated by the recipe, the mixture is pasteurized and cooled and then, optionally, it can be homogenized, preferably hot, under stringent conditions. After cooling the homogenizate to a low temperature, approaching 0° C., the composition may be left to mature for a certain time at this temperature. Homogenization and maturing are optional stages.

This mass, which is optionally homogenized and matured, is referred to in the following description as the "mass to be frozen". It is introduced, preferably at approximately 2–5° C., into a twin-screw freezing device which will be described below in greater detail, in which it is blended by the co-rotating screws revolving at high speed, preferably at about 100–600 revolutions per minute, is led to an air-injection zone where it is expanded by about 20–150%, is strongly cooled to about −8° C. to −20° C., and is then forced through a die.

The work is carried out in the twin-screw device, surprisingly, without excessive shear, so that the pressure increase does not exceed approximately 50 bar at the die. The emerging product is characterized in that it has a mean ice crystal diameter of between about 20 to 60 microns and a mean equivalent diameter for the ice crystals of about 32 to 36 microns. These values are appreciably lower than can be obtained with conventional freezers. The term "ice crystal diameter," as used herein means the largest cross sectional distance of the ice crystal. The term "equivalent diameter," as used herein means the diameter of a circle that has an equivalent surface area as the surface of the crystal. The term "mean," as used herein is the arithmetic mean of measurements taken on several ice crystals. The ice crystal size may be readily determined by one or ordinary skill in the art using a dispersion of ice crystals in mineral oil at −10° C. Ice crystal size may be determined, for example, by the method disclosed in "Determination of Ice Crystal Size Distributions in Frozen Desserts," by D. P. Donhowe et al., *J. Dairy Sci.*, 74: 3334–3344 (1991), the contents of which are expressly incorporated herein by reference. The frozen aerated product of the invention also has smaller air cells and there is less coalescence of the air cells compared to prior art products. The frozen aerated product of the invention also has fat globules, as determined by the Malvern method (laser scattering) in the melted liquid state, that are less than 20 microns, preferably from about 4–20 microns, and more preferably from about 8 to 20 microns. The result is an improvement in texture as regards better oiliness and better creaminess.

The filling is injected into the heart of the vein of frozen composition leaving the extruder, by means of a co-extrusion nozzle at the outlet from the barrel of the screw extruder, a nozzle which, as indicated previously, may be moving or static.

BRIEF DESCRIPTION OF THE DRAWINGS

A device for putting the process into practice is illustrated in the accompanying drawings, given as a non-limiting example, wherein.

DETAILED DESCRIPTION OF THE PREFERRED EMBODIMENTS

Figure 1:
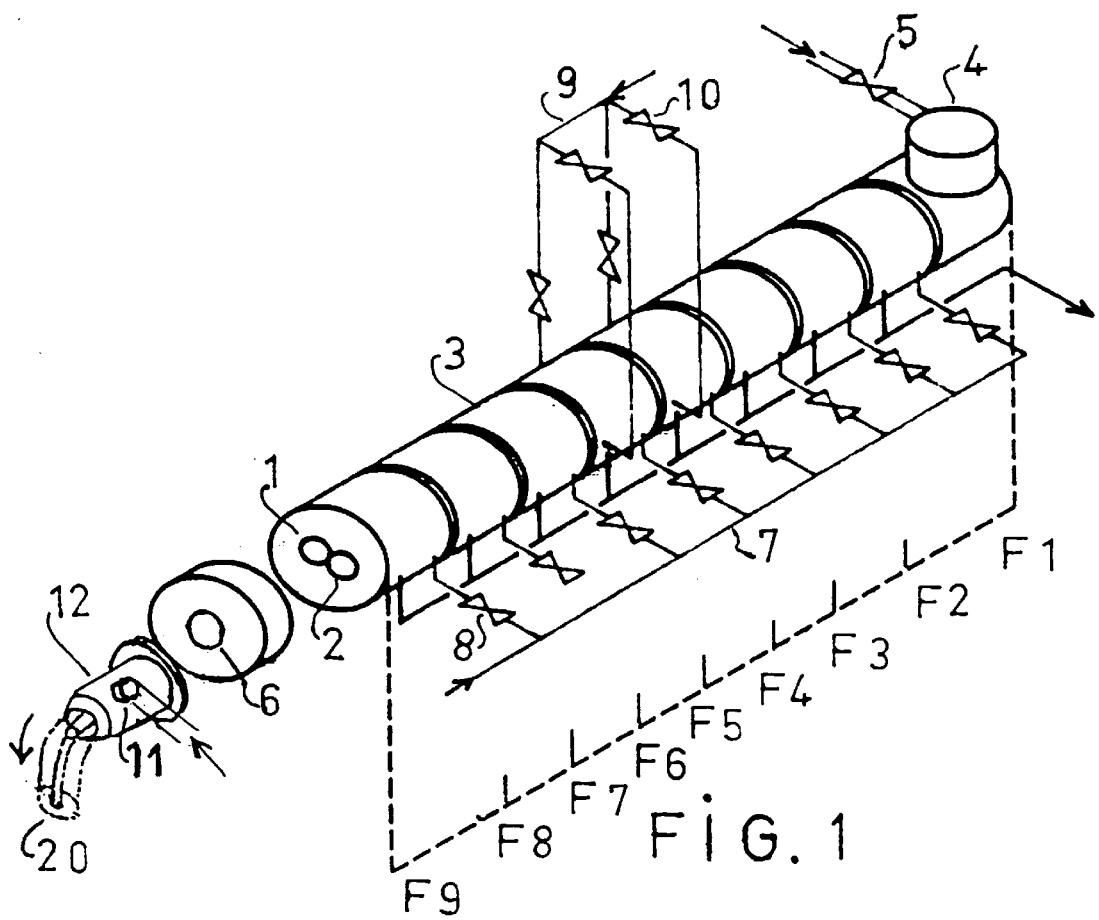
FIG. 1 is a diagrammatic exploded view of the device in perspective.

In FIG. 1, the device comprises two identical and parallel endless screws 1 and 2, intermeshing with each other and rotating in the same direction, driven by a motor (not shown). The screws 1 and 2 are placed in a barrel 3, which has a feed pipe 4 at one of its ends for the mixture to be frozen, provided with a non-return valve 5 ensuring air-tightness, and at the other end a die 6 in the form of a plate.

The device may optionally have means for feeding in air in the intermediate zone.

The two endless screws may have successive segments F1 to F9, where the form of the screw varies from one segment to the other, for example from the point of view of the orientation of the threads and their pitches. The configuration of the screw is such that operations can be carried out in which the mass is conveyed, mixed, sheared and compressed towards the die and, optionally, gas may be incorporated so as to obtain satisfactory expansion. Intermediate zones may be provided for stirring, for example using mono-lobe or bi-lobe discs with a positive orientation, having a conveying effect, or with a negative orientation having a returning effect, or even a segment with an inverse screw pitch inducing a return.

The barrel 3 is provided with cooling means which is generally in the form of a double envelope through which cooling fluids circulate.

The means for cooling preferably comprise one self-contained cooling circuit 7 per segment, with valves 8 controlling the flow rate of the cooling agent, for example a water-alcohol mixture, which enables the temperature of each segment to be individually controlled. The screws may also be cooled in a controlled manner, for example by means of a cooling fluid circuit which may be controlled independently.

Gas, for example air, may be injected by means of flow meters through the pipes 9 at various points of the barrel 3, and preferably in the second half of its length, more preferably on each side of it. The air flow may be regulated individually by the valves 10. In this way, it is possible to achieve, preferably, 80 to 150% overrun.

The die is preferably in the form of a counter-cone, the function of which is to join together the spaces surrounding each screw into a single outlet orifice. It may have a horizontal, vertical or inclined outlet. The geometry and the dimensions of the die or, where appropriate the diameter and length of the outlet pipe which may be connected to it, are designed to ensure a counter-pressure of the order of 4 to 50 bar and preferably 4 to 25 bar. The counter-pressure is ensured by the geometry of the passage taken by the frozen composition in the co-extrusion nozzle; for example in the case of an outlet temperature for the product close to the lower limit, the working diameter of the outlet passage must be increased to compensate for the fall in pressure due to the loss in load caused by the increase in viscosity when the temperature of the mass falls. The die may preferably be cooled, for example by means of a sleeve through which a cooling fluid flows.

The filling is injected, at the outlet from the die 6, by means of a pump (not shown), through the pipe 11 to the core of the vein of frozen composition leaving the extruder, by means of the co-extrusion nozzle 12 positioned at the outlet from the barrel of the screw extruder, a nozzle which, as indicated previously, may be moving or static. The procedure to be adopted is to form a hollow tube of frozen composition into which a filling component is injected with the aid of a pump. The principle consists of pushing the mass of frozen composition around a deflecting device in the form of a needle into which is inserted a passage for the filling.

Figure 2:
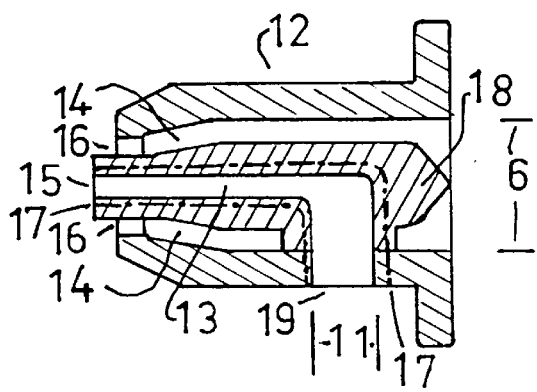
FIG. 2 is a diagrammatic section through a static co-extrusion nozzle.

In FIG. 2, the nozzle 12, fitted to the die 6, comprises a central passage 13 for the filling, connected to a pipe 11 and an annular passage 14 for the frozen composition leaving the die 6. This nozzle delivers a co-extruded extrusion with a central filling surrounded by a sheath of frozen composition, the form of which may be varied according to the configuration of the sections of the respective outlet orifices 15 and 16. According to the nature of the filling, for example if it includes a fatty composition, thermal insulation such as 17 may be provided in the body 18 of the nozzle and around the inlet part of 19 of the passage 13, for example an insulating material or an annular chamber connected to vacuum.

Figure 3:
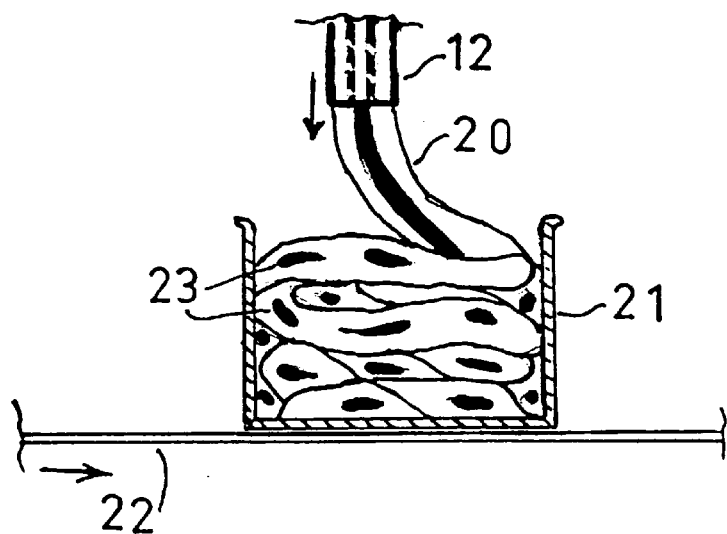
FIG. 3 is a diagrammatic representation of the process for filling a container.

As shown in FIG. 3, the composite extrusion 20 coming from the co-extrusion nozzle 12 is metered into a tray 21, conveyed by a conveyer 22 traveling stepwise under the nozzle. The composite extrusion 20, which still has a plastic consistency, is then folded on itself in successive layers and the filling is distributed in a random manner in the spaces created between the layers as they occupy the volume delimited by the tray within which the mass of frozen composition is confined. Stable solid or liquid inclusions are thus obtained such as 23, held in place due to the particular physical state of the mass of frozen composition. In particular, it should be noted that there is no migration or accumulation of inclusions by gravity at the bottom of the container.

EXAMPLES

The process according to the invention is described in greater detail in the following examples given by way of illustration. Percentages are by weight, unless stated to the contrary.

Example 1

1) Mass of Frozen Composition

A composition to be frozen was prepared having a low freezing point and containing 2% of milk fat (in the form of cream with 35% fats), 12.5% of non-fat milk solids, 13.5% of sucrose, 5% of glucose syrup (with a dextrose equivalent of 38–42), 3% of maltodextrin (with a dextrose equivalent of 15–18), 0.6% of partial glycerides as stabilizers/emulsifiers and 0.4% of vanilla flavoring. The total solids content of the composition was 33%, the balance being represented by water. The mixture was homogenized in two stages at 135 and then 35 bar, was pasteurized at 86° C. for 30 s, cooled to 4° C. and stored for 24 h at this temperature. This composition was introduced into the extrusion device under the following operating conditions Configuration of screws 1 and 2

| Segments | F1 | F2 | F3 | F4 | F5 | F6 | F7 | F8 | F9 |
|---|---|---|---|---|---|---|---|---|---|
| Type of screw T | T/M | T/M | M/C | T | CO | M/CO | M/Ca | CO | |

Where: T=conveyance, M=mixing, C=shearing and CO=compression.

Flow rate of product entering—8 kg/h.

Air injection: in 9 from both sides into F5 and F6, that is through 4 pipes at a flow rate of 15 g/h.

Speed of rotation of the screws: 300 rpm.

Cooling of zones F2 to F9 with a cooling liquid at −30° C./−35° C., the temperature profile being F1–F3, −14° C./F4–F8, −20° C./F9, −23° C.

External diameter of the die: 9 mm.

The temperature of the product as it emerged was −9.5° C. and the overrun 90%.

2) Filling Liquid

Instant cocoa containing sucrose (Nesquik®) was diluted with skimmed milk at a rate of 1.5 kg of cocoa per 1 l of skimmed milk. This liquid was introduced at a flow rate of 1.5 kg/h through the pipe 11 of the co-extrusion nozzle, having a diameter of 4 mm.

3) Composite Product Obtained

Figure 4:
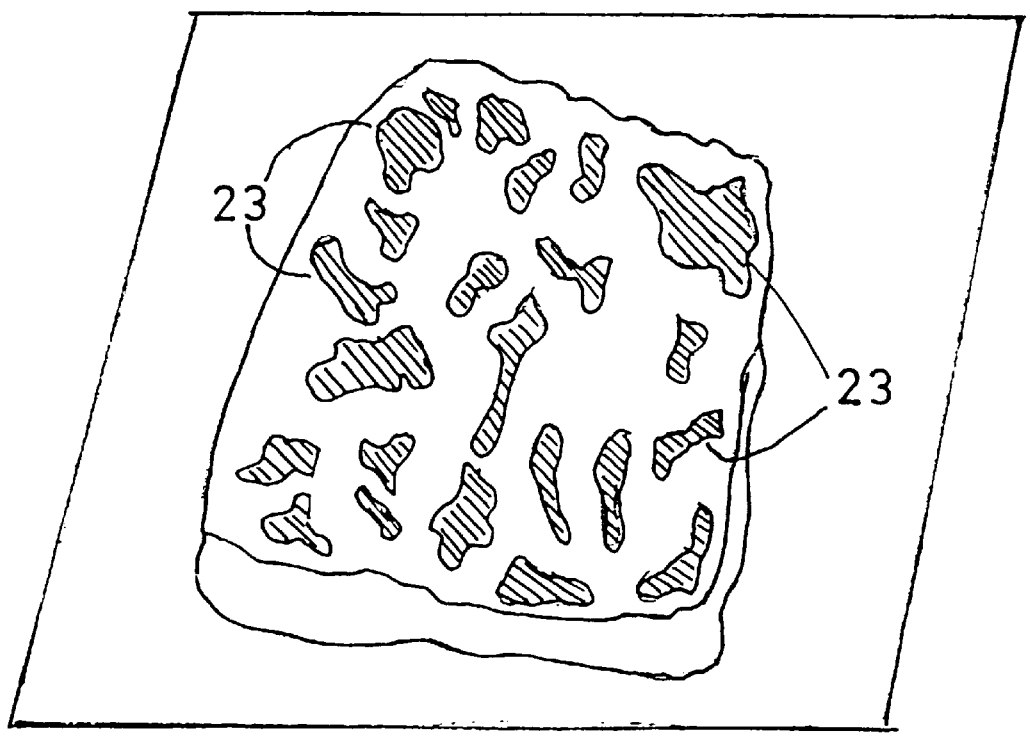
FIG. 4 shows a slice through a co-extruded product, demoulded from the container, sliced and placed on a supporting sheet.

After filling a bulk tray, it was not possible to distinguish the form of the co-extruded extrusion. The appearance of the surface of the product was similar to that of a standard ice cream. After removing the composition from the mould and cutting it up, inclusions were observed such as 23, FIG. 4, very regularly distributed throughout the ice cream mass which, at the end of a few minutes at room temperature, flowed slowly to give a sort of covering. The ice cream, which had a low fat content, had a very creamy texture.

Examples 2–3

The procedure was as in Example 1, but with a cocoa/chocolate mass having the following composition:

Example 2: Cocoa Filling with 63% Dry Matter

| Ingredient | % |
|---|---|
| Granulated sugar | 35 |
| Dehydrated glucose syrup | 16 |
| Dark chocolate paste | 10 |
| Dark cocoa powder | 2 |
| Gelling agent | 0.55 |
| Water | 36.45 |

Example 3: Chocolate Filling with 80% Dry Matter

| Ingredient | % |
| --- | --- |
| Chocolate powder | 30.5 |
| Glucose syrup, invert sugar, hydrogenated vegetable fat, salt, vanilla flavouring | 49.5 |
| Water | 20 |

Example 4

The procedure was as in Example 1, but with a caramel filling mass consisting of a caramelized sugar syrup containing 76% dry matter.

The filling flowed slightly when cut.

Example 5

The procedure was as in Example 1, but with a filling consisting of pure concentrated blueberry juice containing 63% dry matter.

The filling flowed when cut to give a regular covering of the ice cream.

Examples 6–9

The procedure was as in Example 1, but with a filling consisting of a mass of fruit puree having the following composition:

Example 6: Mango Filling with 55% Dry Matter

| Ingredient | % |
| --- | --- |
| Granulated sugar | 48.9 |
| Mango pulp | 30 |
| Lemon juice | 1 |
| Pectin | 0.77 |
| Water | 19.33 |

Example 7: Red Currant Filling with 64.4% Dry Matter

| Ingredient | % |
| --- | --- |
| Dehydrated glucose syrup | 52.7 |
| Red currant puree | 35 |
| Cerelose dextrose (dextrose equivalent 100) | 12 |
| Lemon juice | 0.3 |

Example 8: Apricot Filling with 30–50% Dry Matter

| Ingredient | % |
| --- | --- |
| Sucrose | 10 |
| Apricot puree, glucose syrup, gelling agent (fruit pectin), flavourings, malic acid | 90 |

Example 9: Chestnut Filling with 30–50% Dry Matter

So that the filling could be pumped, chestnut puree was mixed with skimmed milk at a rate of 1 kg of puree per 0.5 dl of milk.

The inclusions obtained remained solid when the product was sliced, thus giving the illusion of pieces of fruit.

Examples 10–12

The procedure was as in Example 1, but with a vegetable sorbet as the frozen composition and a vegetable-based filling, which could have been the same or different, with the following composition for the filling:

Example 10: Vegetable Filling with 30% Dry Matter

| Ingredient | % |
| --- | --- |
| Vegetable pulp (avocado, carrot) | 50 |
| Granulated sugar | 17 |
| Microbiological stabilizer | 0.3 |
| Lemon juice | 1.7 |
| Pepper | 1 |
| Salt | 1 |
| Water | 30 |

Example 11: Tomato Filling with 28% Dry Matter

| Ingredient | % |
| --- | --- |
| Tomato puree | 45 |
| Cerelose dextrose (dextrose equivalent 100) | 5 |
| Polydextrose | 10 |
| Granulated sugar | 3 |
| Glucose syrup | 10 |
| Microbiological stabilizer | 0.4 |
| Lemon juice | 0.6 |
| Flavouring | 0.05 |
| Colouring | 0.01 |
| Water | 25.04 |

Example 12: Melon Filling with 28.7% Dry Matter

| Ingredient | % |
| --- | --- |
| Melon puree | 45 |
| Liquid sucrose | 14.7 |
| Glucose syrup | 6.3 |
| Invert sugar 2/3 | 5.5 |
| Flavouring | 2 |
| Gelatin | 0.4 |
| Carob gum | 0.15 |
| Colouring | 0.005 |
| Water | 25.95 |

In the preceding examples, the process and apparatus have been described in relation to the manufacture of a frozen composition without it being specified that it is possible to process by co-extrusion several ice creams, sorbets or sherbets with different flavors and colors at the same time, thus to obtain composite products, for example marbled products, containing inclusions.

The process is of course applicable to the manufacture of frozen products such as mousses, creams and spreads, either sweet or salt, for example made with cheese, vegetables, meat or fish or culinary sauces or salad creams. In these cases, the flexibility of the process makes it possible to adjust the inclusion of air in the composition to be frozen according to the varying degree of overrun desired in relation to the characteristics of the products aimed at.

What is claimed is:

1. Process for manufacturing a frozen composition containing inclusions, which comprises forming extrusions of a central filling surrounded by a sleeve of frozen composition by co-extrusion at a temperature of less than or equal to about −8° C., and processing the extrusions into a mass of frozen composition incorporating the inclusions distributed in a random manner within the mass of frozen composition.

2. Process according to claim 1 wherein the frozen composition is prepared by mixing, aerating, and freezing a composition at a temperature equal to or less than about −8° C. and passing the frozen composition through an extrusion die, wherein these steps take place in a single step in a single extrusion device having two parallel endless screws, turning in the same direction by being intermeshed with each other and being situated in a barrel provided with means of aeration and cooling so as to shape the emerging co-extruded extrusion.

3. Process according to claim 1 which further comprises placing the extrusion upon itself by continuously delivering the extrusion through an extrusion nozzle while moving the nozzle to form layers of the extrusion without separation of the inclusions.

4. Process according to claim 1 to which further comprises placing the extrusion upon itself by continuously delivering the extrusion through an extrusion nozzle and onto a tray while moving the tray onto which the extrusion is delivered to-form layers of the extrusion without separation of the inclusions.

5. Process according to claim 1 wherein the co-extrusion is conducted by passing the frozen composition around a deflecting device which includes a passage for forming a core of the filling in the frozen composition and introducing the filling through the passage of the deflecting device to provide the core of the frozen composition.

6. Process according to claim 2 wherein the extrusion die is designed to ensure a counter-pressure of about 4 to 50 bar, and is cooled to assist in controlling the temperature of the frozen composition.

7. Process according to claim 2 wherein a gas is injected into the extrusion device at one or more points along its length to achieve an overrun of at least about 80% and aerate the mass of frozen composition.

8. Process according to claim 5 wherein the deflecting device is insulated to assist in controlling the temperature and form of the filling.

9. Process according to claim 1 wherein the frozen composition is an ice cream, sorbet, sherbet or mousse and the filling is an aqueous or fatty composition having a dry matter content of about 28 to 80 wt. %, and which further comprises forming a hollow tube of the frozen composition while pumping the filling into the tube using a co-extrusion nozzle.

10. Process according to claim 6 wherein the extrusion device comprises a twin screw conveyor and which further comprises rotating the screws at about 100 to 600 revolutions per minute so as to form a frozen composition having a mean ice crystal diameter of between about 20 to 60 microns and a mean equivalent diameter for the ice crystals of about 32 to 36 microns.

11. The apparatus for performing the process of claim 1 comprising two endless screws, identical and parallel, meshing with each other, and rotating in the same direction, located in a casing having two ends, fitted at the first end with a feed pipe for introducing a composition to be frozen, and fitted at the second end with a die in the from of a plate connected to a co extrusion nozzle having a central annular passage for introducing the filling into the frozen mass, and a intermediate area between the first end and second end with means for feed air into the composition to be frozen, the casing being provided with a jacket in which a refrigerant fluid circulates.

* * * * *

UNITED STATES PATENT AND TRADEMARK OFFICE
CERTIFICATE OF CORRECTION

PATENT NO.   : 6,514,555 B1
DATED        : February 4, 2003
INVENTOR(S)  : Fayard et al.

It is certified that error appears in the above-identified patent and that said Letters Patent is hereby corrected as shown below:

<u>Title page,</u>
Item [57], ABSTRACT,
Last line, change "moving of static." to -- moving or static. --.

<u>Column 9,</u>
Line 23, change "to-form" to -- to form --.

Signed and Sealed this

Third Day of June, 2003

JAMES E. ROGAN
*Director of the United States Patent and Trademark Office*